United States Patent
Joos et al.

(10) Patent No.: US 6,536,415 B2
(45) Date of Patent: Mar. 25, 2003

(54) METHOD AND DEVICE FOR DIAGNOSING THE FAILURE OF A FUEL DELIVERY DEVICE IN A FUEL SYSTEM

(75) Inventors: Klaus Joos, Walheim (DE); Mathias Rollwage, Ditzingen (DE); Karsten Kroepke, Ludwigsburg (DE); Jens Wolber, Gerlingen (DE); Thomas Frenz, Noerdlingen (DE); Manfred Kirschner, Stuttgart (DE); Klaus-Dieter Hufnagel, Moeglingen (DE); Ingo Richter, Markgroeningen (DE); Markus Amler, Leonberg-Gebersheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/803,680

(22) Filed: Mar. 5, 2001

(65) Prior Publication Data

US 2001/0032622 A1 Oct. 25, 2001

(30) Foreign Application Priority Data

Mar. 6, 2000 (DE) .......................................... 100 10 857

(51) Int. Cl.⁷ ............................................... F02M 37/04
(52) U.S. Cl. ........................................ 123/497; 123/509

(58) Field of Search ............................. 123/497, 359, 123/198 D, 357, 509, 510

(56) References Cited

U.S. PATENT DOCUMENTS

| | | | | |
|---|---|---|---|---|
| 4,018,201 A | * | 4/1977 | Williams et al. | 123/359 |
| 4,491,112 A | * | 1/1985 | Kanegae et al. | 123/479 |
| 4,523,563 A | * | 6/1985 | Moore et al. | 123/359 |
| 4,726,335 A | * | 2/1988 | Brauninger | 123/198 D |
| 4,827,897 A | * | 5/1989 | Yamada et al. | 123/497 |
| 5,555,872 A | * | 9/1996 | Takeuchi et al. | 123/497 |

FOREIGN PATENT DOCUMENTS

DE    32 47 915    7/1984

* cited by examiner

Primary Examiner—Willis R. Wolfe
Assistant Examiner—Mahmoud Gimie
(74) Attorney, Agent, or Firm—Kenyon & Kenyon

(57) ABSTRACT

A method and a device are described for diagnosing a fuel system having a plurality of electric fuel delivery units, which are submerged on the inlet side in a fuel supply contained in a fuel tank, and which, on the outlet side, deliver fuel in a fuel line to an internal combustion engine. The currents of the electric fuel delivery units are measured directly or indirectly in an analysis unit, compared to one another, and a diagnostic signal in digitized form is generated as a function of the result of the comparison.

12 Claims, 1 Drawing Sheet

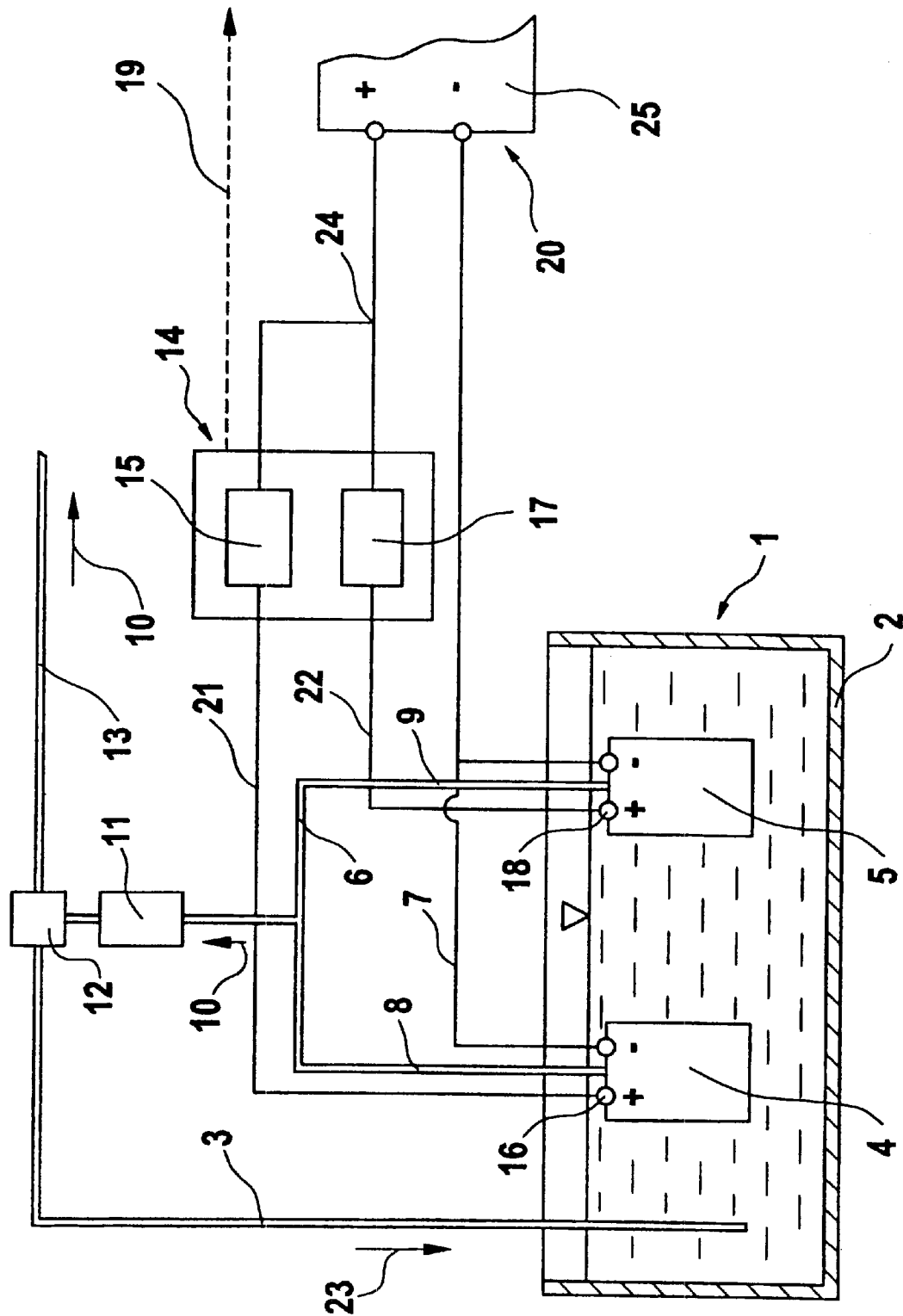

METHOD AND DEVICE FOR DIAGNOSING THE FAILURE OF A FUEL DELIVERY DEVICE IN A FUEL SYSTEM

FIELD OF THE INVENTION

The present invention relates to a method and a device for diagnosing the failure of a fuel delivery device in a fuel system, for example, in a motor vehicle. In fuel systems used in internal combustion engines having a high piston displacement, it may be necessary to use a plurality of fuel delivery devices in order to cover the maximum fuel consumption under certain operating states.

BACKGROUND INFORMATION

German Published Patent Application No. 32 47 915 describes a fuel delivery system for internal combustion engines, in particular in motor vehicles. In the fuel delivery system disclosed in this document, a main delivery pump and an additional delivery pump are used. The amount delivered by the electrically controllable additional delivery pump which influences fuel metering is controlled using a controller as a function of the operating state of the parameters characterizing the internal combustion engine such as, for example, rotational speed, power output, acceleration phases or deceleration phases, exhaust values, or temperature values.

In this configuration of a fuel delivery system, the main delivery pump delivers a constant amount of fuel, while the additional delivery pump covers the amount over this constant amount. The fuel delivery system is used in particular in supercharged internal combustion engines. In the fuel delivery system described in German Published Patent Application No. 32 47 915, both fuel delivery units are mechanically driven.

In today's applications of fuel systems, internal combustion engines are supplied with fuel, the fuel consumption of the engine increasing considerably in certain operating states. If only one fuel pump is used, its failure is not diagnosed, because with the failure of the fuel the engine stalls automatically. However, if two electric fuel pumps are used, for example, in internal combustion engines having a higher fuel consumption and greater piston displacement, the engine normally continues to operate if one of the electric fuel pumps fails.

However, one electric fuel pump operating alone cannot fully cover the high consumption of the engine. As a result, the fuel/air mixture becomes leaner and combustion failure occurs. The unburned fuel/air mixture may reach the hot catalytic converter, damaging it. For this reason, multiple electric fuel pumps have not been used to date in fuel systems of gasoline engines.

SUMMARY OF THE INVENTION

Using the option proposed according to the present invention to monitor the operation of a plurality of fuel/air delivery units integrated in a fuel system, the fuel consumption of large engines can be sufficiently covered, so the their fuel supply, including the supply of any ejectors used, can be ensured even at high system pressures. The safety effect that can be achieved with the present invention can be seen in the fact that a mixture that has become leaner is detected in a timely manner through the timely detection of the failure of a electric fuel delivery pump by the electronic engine control system and countermeasures are taken, for example, by limiting the engine power output.

By triggering engine power output limiting, the operating parameters of the internal combustion engine are modified so that combustion failure cannot occur, making sure that an unburned fuel/air mixture fails to reach the catalytic converter of the exhaust system of the vehicle, damaging it. This ensures continued safe operation of the internal combustion engine, the fuel consumption being covered via the still operational electric fuel pumps, the engine being still operable although under limited conditions regarding the engine power that can be obtained.

Through the engine power limiting triggered due to the failure of the electric fuel delivery unit, damage to the catalytic converter of gasoline engines whose fuel systems contain a plurality of fuel delivery units can now be definitively prevented; furthermore, a record can be entered in an error memory through the diagnostic signal, so that the occurrence of an error is detected at the time of a scheduled or unscheduled reading of this memory and can be immediately corrected.

Current measuring elements such as shunts, Hall elements, or Reed contacts can be integrated into the leads to the fuel delivery units for direct and indirect current measuring. A shunt is understood in the following to be a measuring resistor connected in series.

These devices allow currents or voltage drops to be directly or indirectly measured and compared. Furthermore, comparisons with maximum or minimum values provided by the electronic control system can be made.

BRIEF DESCRIPTION OF THE DRAWING

The FIGURE shows the schematic design of a current-measuring configuration for a fuel system having a plurality of electrically driven fuel delivery units.

DETAILED DESCRIPTION

The fuel system for supplying an internal combustion engine having a high fuel consumption includes a fuel tank 1 with two fuel delivery units designed as electric fuel pumps 4, 5 arranged above tank bottom 2. The pumps contain a priming valve and ejector arrangements. A return line 3 branching off at pressure regulator 12 returns excess fuel to fuel tank 1.

First electric fuel delivery unit 4 delivers into a first delivery branch 8 of delivery line 6 on the high-pressure side, while second electric fuel delivery unit 5 delivers into a second delivery branch 9 of delivery line 6 on the high-pressure side. The pressurized fuel is delivered in delivery direction 10 through a filter element 11, which retains impurities contained in the fuel. A delivery line 6 extends from filter element 11 to pressure regulator 12, from which the above-mentioned return line 3 branches off to fuel tank 1, while supply line 13 extends to the injection system of the internal combustion engine, supplying the latter with fuel.

Electric fuel pumps 4, 5 installed in fuel tank 1 are jointly connected to ground, for example, via a ground terminal 7. First electric fuel pump 4 is connected to a voltage source via a lead 21 attached to terminal 16, while second electric fuel pump 5 is connected to voltage source 25 via lead 22 and terminal 18. Leads 21, 22 from the two electric fuel pumps 4, 5 pass through an analysis unit 14 containing detector elements 15, 17 associated with leads 21 and 22, respectively. The current values measured by detector elements 15 and 17 are analyzed in analysis module 14; the measured current values can be analyzed either in separate analysis modules or within the central engine controller.

Failure of one of the multiple electric fuel delivery units 4, 5 can be determined in that the current to this fuel delivery unit drops below a certain threshold value or approaches zero. A blocked rotor of an electric fuel delivery unit 4, 5 or a short-circuit can be detected if the current to the respective electric fuel delivery unit 4, 5 exceeds a threshold value. In a simplified manner, a plurality of electric fuel pumps can be combined for measuring the current, for example, two electric fuel pumps, which represents the most likely case in practice. In this case, the difference between the currents to the two electric fuel delivery units 4, 5 is measured. If the absolute value of the difference between the currents $\Delta I$ exceeds a threshold value $\Delta I_{max}$, this indicates the malfunction of an electric fuel delivery unit; such a malfunction may include: failure, blocking, or short-circuit.

In order to rule out erroneous diagnoses by the analysis module, threshold value $\Delta I_{max}$ should be preselected so that the malfunction of one of the electric fuel pumps can be reliably detected, but the normal spread of pump values has no effect.

The currents to the two fuel delivery units can be measured in different manners:

Shunts, i.e., measuring resistors connected in series, for example, are suitable for measuring currents. Either a single shunt or several shunts can be used.

When using a single shunt, a current window can be defined within which the current consumption of the two electric fuel delivery units 4, 5 is normally located. The malfunction of one of the two electric fuel delivery units can be detected by the fact that current consumption is outside a current window thus defined. The voltage drop $U_N$ across the shunt can be compared to threshold values $U_{N,min}$ and $U_{N,max}$. If shunts are used, the respective voltage drops are compared to the corresponding threshold values. As an alternative, the absolute value of the voltage difference can be compared to a threshold value $\Delta U_{max}$.

When using Hall elements as detector elements, the procedure is basically the same. In using a single Hall element, the resulting Hall voltage $U_{Hall}$ can be compared to a threshold value $U_{max}$.

When using two Hall elements as amperemeters 15, 17 for current measurement, each of the individual voltages measured by the Hall elements can be compared to a threshold value; a voltage difference can be determined, whose absolute value can be compared to a threshold value $\Delta U_{max}$ as an alternative.

From the result of this comparison, analysis logic 14 triggers a diagnostic signal 19 in digital form.

If Reed elements are used as detectors 15 and 17 on leads 21 and 22, respectively, a signal voltage is generated if a resulting magnetic field induced by the current exceeds a threshold value. If two Reed elements are used, i.e., a separate Reed element is assigned to each of leads 21 and 22, signal voltages are generated if the magnetic fields induced drop below threshold values.

When using Hall elements and Reed contacts for current measurements on leads 21 and 22, leads 21, 22 can be counterwound in the area of the Hall elements or Reed contacts. The magnetic field resulting on the Hall elements or Reed contacts corresponds to the difference between the currents measured in the respective leads 21 and 22 to the two electric fuel delivery units 4, 5.

If the two electric fuel delivery units 4, 5, which can be preferably connected in parallel to one another but may also be connected in series, fail at the same time, fuel delivery is interrupted and the engine stalls as occurs in the case of use of a single electric fuel pump.

The measured current signals in leads 21, 22 can be analyzed either centrally in the electronic engine controller or in separate modules 14 having analysis logic which transmit diagnostic signals 19 in digital form into the engine controller.

REFERENCE SYMBOLS

1. Fuel tank
2. Tank bottom
3. Return line
4. First fuel pump
5. Second fuel pump
6. Delivery line
7. Ground terminal
8. First delivery branch
9. Second delivery branch
10. Direction of delivery
11. Filter element
12. Pressure regulator
13. Supply line
14. Analysis logic
15. First detector
16. Terminal
17. Second detector
18. Terminal
19. Diagnostic signal
20. Voltage supply
21. Lead
22. Lead
23. Return direction
24. Branching
25. Energy accumulator

What is claimed is:

1. A method for diagnosing a fuel system including a plurality of electric fuel delivery units that are submerged on an inlet side in a fuel supply contained in a fuel tank, and that, on an outlet side, deliver a fuel in a fuel line to an internal combustion engine, comprising the steps of:
   performing one of the steps of:
      directly measuring currents of the electric fuel delivery units in an analysis unit, and
      indirectly measuring the currents in the analysis units;
   analyzing the currents by performing one of:
      comparing the currents to each other, and
      comparing the currents to threshold values; and
   outputting a diagnostic signal as a function of a result of the comparing step.

2. The method according to claim 1, wherein:
   a detector is associated with each one of the electric fuel delivery units in order to measure the currents.

3. The method according to claim 1, further comprising the step of:
   causing detector elements to monitor two of the electric fuel delivery units, wherein:
      the detector elements analyze a differential current between the two electric fuel delivery units, and
      the two electric fuel delivery units correspond to two electric fuel pumps.

4. The method according to claim 1, further comprising the step of:
   causing at least one shunt to measure a current in leads to the electric fuel delivery units.

5. The method according to claim 1, further comprising the step of:

causing at least one Hall element to measure a current to the electric fuel delivery units.

6. The method according to claim 1, further comprising the step of:
causing at least one Reed contact to measure a current to the electric fuel delivery units.

7. The method according to claim 1, further comprising the step of:
causing at least one shunt to measure a current to the electric fuel delivery units .

8. The method according to claim 4, wherein when the at least one shunt corresponds to one shunt, a current window can be determined, within which a current consumption of the electric fuel delivery units is located.

9. The method according to claim 4, further comprising the step of:
performing one of the steps of:
comparing a first voltage drop and a second voltage drop across the at least one shunt to a first threshold value and a second threshold value, and
comparing a difference between the first voltage drop and the second voltage drop to a third threshold value.

10. The method according to claim 4, further comprising the step of:
performing one of the steps of:
comparing a first voltage drop and a second voltage drop across the at least one Hall element to a first threshold value and a second threshold value, and
comparing a difference between the first voltage drop and the second voltage drop to a third threshold value.

11. The method according to claim 6, wherein:
the at least one Reed contact generates a signal voltage if an induced magnetic field one of exceeds and drops below a threshold value.

12. A device for diagnosing a.fuel system including a plurality of electric fuel delivery units that are submerged on an inlet side in a fuel supply contained in a fuel tank, and that, on an outlet side, deliver a fuel in a fuel line to an internal combustion engine, comprising:
an analysis unit for one of directly and indirectly measuring currents of the electric fuel delivery units;
an arrangement for performing one of:
a comparison of the currents to each other; and
a comparison of the currents to threshold values; and
an arrangement for outputting a diagnostic signal as a function of a result of the comparison.

* * * * *